United States Patent [19]

Hunt et al.

[11] Patent Number: 5,362,759
[45] Date of Patent: Nov. 8, 1994

[54] PROCESS FOR RECLAIMING ELASTOMERIC WASTE

[75] Inventors: James R. Hunt, 1800 Montreal Ct., Suite A, Tucker, Ga. 30084; David Hall, Auburn, Ala.

[73] Assignee: James R. Hunt, Tucker, Ga.

[21] Appl. No.: 191,820

[22] Filed: Mar. 21, 1994

[51] Int. Cl.$^5$ ............................................. C08J 11/04
[52] U.S. Cl. ................................. 521/44.5; 521/148; 521/149; 521/150
[58] Field of Search .................... 521/44.5, 148, 150, 521/149

[56] References Cited

U.S. PATENT DOCUMENTS 5,223,543  6/1993  Iovino ................................. 521/146

Primary Examiner—Morton Foelak
Attorney, Agent, or Firm—John Lezdey

[57] ABSTRACT

There is provided a process for reclaiming elastomeric waste material, particularly rubber, which includes the steps impregnating the elastomeric waste material with an essential oil and then heat treating the impregnated material under reduced pressure with microwave radiation.

7 Claims, 2 Drawing Sheets

PROCESS FOR RECLAIMING ELASTOMERIC WASTE

BACKGROUND OF THE INVENTION

Field of the Invention

This invention relates to a process for the reclamation of elastomeric waste material to produce usable raw material. In one of its specific aspects, it relates to an improved process for reclaiming rubber.

Description of the Prior Art

Polymeric or plastic materials represent a significant waste disposal problem. For example, rubber reclaiming has become of particular interest because of the accumulation of large quantities of scrap tires which presents a major environmental problem.

Generally, the commercial processes for reclaiming vulcanized rubber depends on heating the rubber with rubber reclaiming solvents or oils. The heating is suitably conducted at the usual rubber reclaiming temperature of above 100° C. and for a period to cause depolymerization or desulfurization to occur.

Scrap rubber to be reclaimed by the conventional reclamation processes is cut and ground into small pieces which are mechanically treated to remove fibrous materials which may be present in such scrap rubber, usually vulcanized as that obtained from old vehicular tire casings, rubber belts and the like. Following the removal of metallic and fibrous materials, the particulate rubber is subjected to heat (300° to 500° F.) and pressure (60 to 250 psi) in contact with a rubber reclaiming solvent or oil which serves to penetrate and swell the rubber and which assists materially in bringing it into condition for reworking. There are various types of rubber reclaiming solvents or oils which are used in conventional processes. Aliphatic hydrocarbon oils have been used with other hydrocarbon cuts which are chiefly aromatic and devoid of resin-forming components. Such conventional reclaiming solvents include coal tar naphthas, olefinic and/or aromatic fractions obtained from thermal or catalytic cracking operations, acid-soluble oils obtained from thermal or catalytic cracking operations, acid-soluble oils obtained from alkylation of isoparaffins with olefins and other hydrocarbon solvents generally boiling in the range of 225° to 500° F. However, most of the above solvents are now considered toxic to the environment.

U.S. Pat. No. 4,469,817 to Hayaski, et al proposes to obviate the necessity for process oils and to reduce the heating time in a reclaiming process by means of microwave heating of vulcanized rubber to a temperature for desulfurization (devulcanization) of rubber and upon completion of the desulfurization, quenching the desulfurized rubber to a temperature at which there is substantially no oxidation of the desulfurized rubber. However, the rate of cooling is critical and must be closely monitored and the devulcanization temperatures are high and range from about 180° C. to 350° C.

Japanese Application No. Sho 54 (1979) 126761 mentioned in the Hayaski et al patent discloses a method for the reclamation of vulcanized rubber comprising the steps of (a) classifying scrap vulcanized rubber by kind; (b) pulverizing the separated vulcanized rubber into powder; (c) admixing the pulverized vulcanized rubber with a conventional rubber process oil; (d) desulfurizing the vulcanized rubber powder by using microwave heating. According to the patent application the incorporation of the conventional rubber process oils minimizes the contact of the rubber molecules sufficiently to retard the oxidation of the rubber.

However, when large volumes of scrap vulcanized rubber are to be processed, according to this method the interior of the rubber mass does not expel the heat generated and the mass of rubber remains in an overheated state and induces undesirable side effects such as fracture of the molecules, decomposition of the rubber reclaiming solvents (process oils) and other components possible carbonization of the rubber and other components including the rubber reclaiming solvents.

Most of the aforementioned solvents and oils are considered toxic to humans and are a hazard to the environment. Thus, a process that provides for the reclaiming of waste rubber and/or plastic material to provide highly useful raw material on a commercial scale by a highly efficient and an environmentally safe process is most desirable.

An object of the present is to provide an improved and environmentally safe process for reclaiming elastomeric materials.

Another object of this invention is to provide an improved and environmentally safe rubber reclaiming process.

Another object of this invention is to provide an improved rubber reclaiming solvent.

Yet another object of this invention is to reduce the process time involved in the reclaiming of rubber.

Still another of object of this invention is to reduce any undesirable reaction products and provide for a useful high quality of raw material.

SUMMARY OF THE INVENTION

This invention relates to a process for reclaiming elastomeric materials which features the treatment of the scrap materials with an environmentally safe solvent, an essential oil, followed by contacting the material with a source of microwave radiation under a vacuum. More particularly the process is directed to reclaiming vulcanized rubber from vehicular tires. Broadly, the process comprises the steps of:

a) treating the elastomer or its chips with an essential oil;

b) comminuting the treated elastomer into particles;

c) subjecting the particles to a magnetic separator to remove the ferrous metals;

d) subjecting said particles to a microwave vacuum reactor cell whereby substantially all the essential oil is removed; and e) recovering the elastomer particles.

Optionally, the tire chips after treatment with the essential oil can be passed through the microwave vacuum cell without comminuting if these chips are free of ferrous metals to provide larger pieces of rubber chips. Also, the elastomer may be treated with an essential before and/or after shipping.

The microwave vacuum reactor cell allows the process to be operated at temperatures less than half of the temperatures conventionally required. Thus, reducing degradation of the reclaimed rubber.

DESCRIPTION OF THE PREFERRED EMBODIMENTS

In accordance with this invention the process comprises treating an elastomer, with at least one essential oil for example, d-limonene and treating the treated elastomer with a microwave vacuum reactor cell. By microwaving in vacuum, the operating temperatures and times are reduced to about half of the usual requirements at which substantially no oxidation of the reclaimed material occurs providing a clean, high quality raw material.

Figure 1:
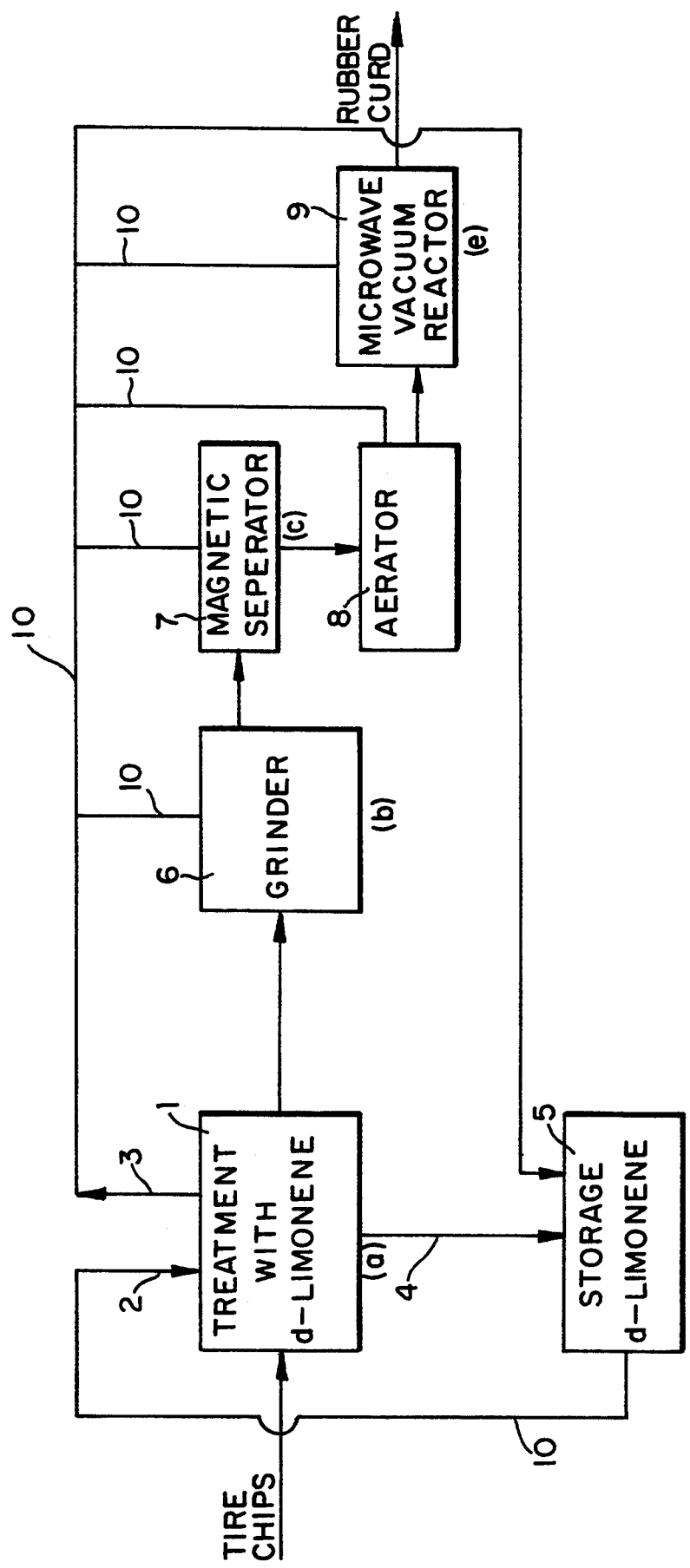
FIG. 1 is a block diagram illustrating the process of this invention for the reclamation of waste elastomeric material.

Referring to FIG. 1 which is a block diagram illustrating one process for reclaiming used vehicular tires comprising the steps of the process of the present invention. According to the present invention as represented beginning in block (a) used tires cut into chips of varying sizes are loaded into a vessel 1 having an inlet means 2, venting means 3 and outlet means 4. The reclaiming solvent of this invention, d-limonene, is then charged into the vessel 1 through the inlet means 2. The vessel 1 is pressurized to about 150 psi. After a suitable treatment by soaking for a period of at least 30 minutes, the excess d-limonene is drained through the outlet means 4 in a closed circuit to the reclaiming solvent storage vessel 5, vapors are vented through the vent means condensed and recovered through a closed recovery circuit 10 to the reclaiming solvent storage vessel 5. The closed vapor collection circuit 10 throughout the process is under vacuum and substantially no vapor escapes to the atmosphere. The tire chips are fed into a grinder 6 as illustrated by block (b) where they are reduced in size to particles or curds. After being ground to a prescribed size, the rubber is passed to a magnetic separator 7 to remove small bits of ferrous metals which may be present, i.e., from the wire used in the steel belting of the tire, and from the grinding machine. The rubber curd is passed over an aerator 8 to separate the fibrous material, e.g., polyester fiber.

Following the above described grinding and cleaning treatments, the rubber curd is fed into a microwave vacuum cell reactor 9. The microwave vacuum cell reactor may be operated under a reduced pressure and ranges to vacuum. The microwave energy generated is delivered by a wave guide tube (not shown) and released into the reactor cell to effect the heating of the vulcanized rubber. It is preferable to simultaneously stir the rubber curds to uniformly distribute the heat generated in the rubber curds by the microwave vacuum reactor cell.

The heating is continued until the temperature of the rubber curds undergo desulfurization or more generally depolymerization and the essential oils entrained in the rubber particles is released to the recovery system 10. After cooling a clean, small sized rubber particle product is discharged from the microwave vacuum cell reactor.

Figure 2:
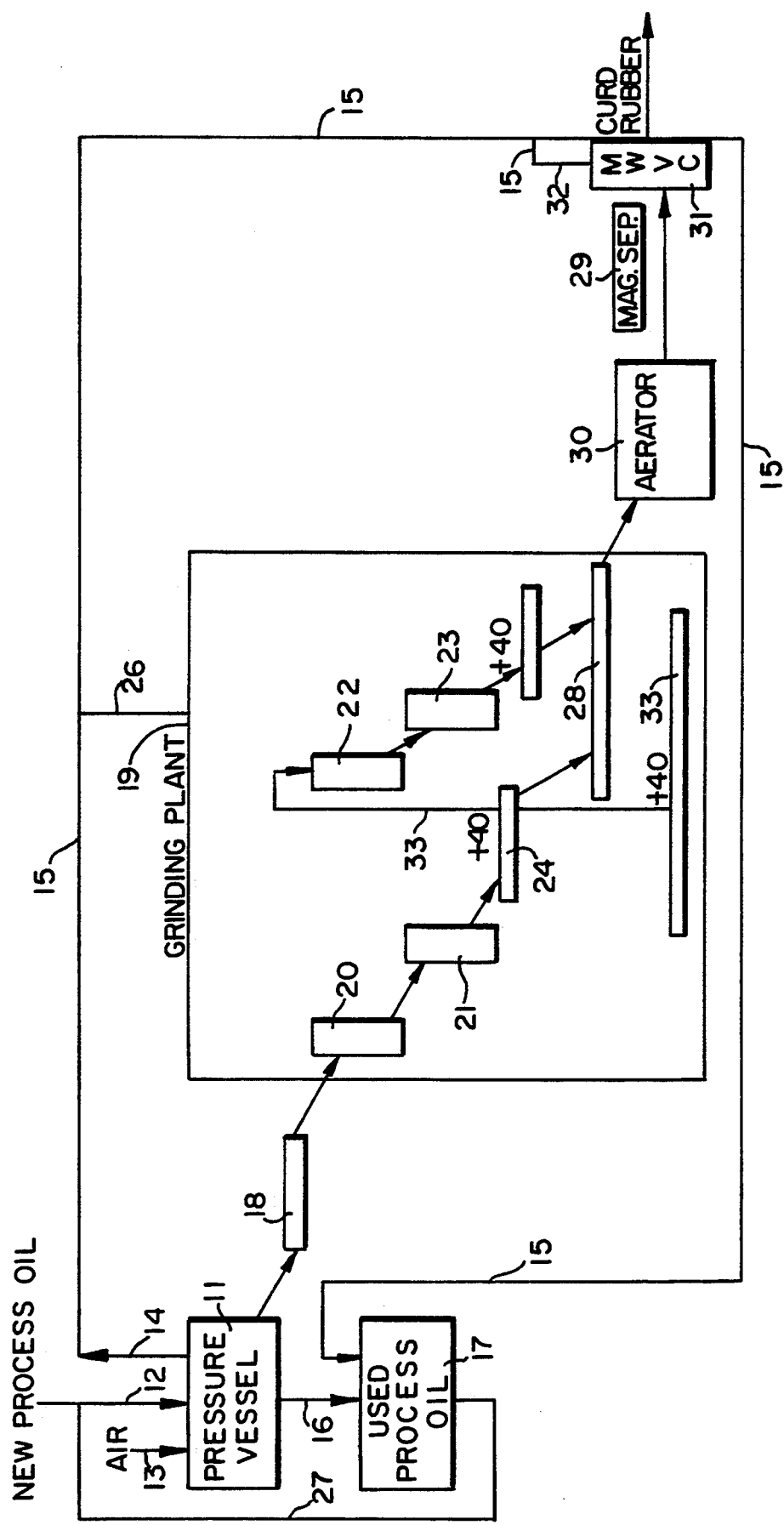
FIG. 2 is a flow diagram showing a specific embodiment of this invention for the reclamation of vulcanized rubber from used vehicular tires.

Reference is made to FIG. 2 to illustrate an essentially automated process of this invention, a load of rubber tire chips from a primary chipper (not shown) is charged to a pressure vessel 11. The pressure vessel 11 is automatically locked. An automatic coupler (not shown) is advanced and is attached to the process oil fill hose 12, the pneumatic pressure hose 13, and the vent hose 14 through self-sealing couplings (not shown). A sufficient amount of a process oil of the invention, example d-limonene is added to cover the tire chips. The vessel 11 is pressurized with air to about 150 psi. After a soaking time of at least about 30 minutes, the vessel is depressurized through vent hose 14, vented and the vapors are collected through vacuum line 15 to be condensed, filtered and recovered to storage tank 17. The d-limonene is drained from vessel through draining means 16 into storage tank 17. Then the automatic coupler is withdrawn and uncouples the aforementioned hoses. After evacuation of the vessel 11, the soaked rubber chips are unloaded onto a conveyor 28 to be transferred to grinding plant 19 which comprises grinding machines 20, 21, 22, 23, each capable of exerting 400 tons of pressure on the soaked tire chips and vent means 26. The soaked tire chips are fed into grinder 20 then grinder 21. The twice ground chips are passed over vibrating screen 24 separating all material below 40 mesh which falls onto conveyor 28. All plus 40 mesh is passed to grinder 22 and grinder 23 by a transfer means 33. Again all material below 40 mesh is separated by vibrator screen 25 and is fed onto conveyor 28. The below 40 mesh material on conveyor 28 is passed into aerator 30 to separate any fiber. The material is passed under a magnetic separator 31 which removes wire and small bits of ferrous materials which may be embedded in the rubber. These ferrous materials are fed directly into a furnace (not shown). Any remaining rubber material which is plus 40 mesh is fed back to grinder 22 and grinder 23 to provide homogeneous particles of minus 40 mesh curd rubber. Optionally at this point in the process, the curd rubber may be passed to a storage bin to be later treated with microwave or in a continuous process may be passed directly to the microwave vacuum reactor cell.

The microwave vacuum reactor cell 31 equipped with a stirrer not shown) and a vapor outlet means 32 is charged with the minus 40 mesh curd rubber and evacuated to a vacuum of at least 28 inches of mercury. The curd rubber is stirred while being simultaneously subjected to microwave energy, as a result, uniform heating is carried out throughout the charge to desulfurize the rubber and to vaporize any process oil entrapped in the rubber. The vulcanized rubber is heated by microwave to a temperature of about 50° to 100° C., preferably about 78° C. The heating time is generally about 15 minutes. The temperature is controlled by a temperature sensor (not shown) and automatically controls the operation of the microwave vacuum reactor cell. The vapors emanating from the process oil entrapped in the rubber and the gases generated by the desulfurization reaction are vented through the vapor outlet means 32. The process oil is separated, from the other components, condensed, recovered, filtered and pumped to the process oil storage tank to be recycled to the pressure vessel 11 by line 27. Generally the recovery of the process oil ranges from about 90-98%. The other gases emanating from the vulcanized rubber are recovered and safely removed. After cooling a clean small high quality particle rubber product is discharged into storage bins.

The reclaimed rubber produced by the process of this invention is useful as raw material in the manufacture of ceiling tiles, floor tiles, shingles, tires, tubes, belts and other rubber industrial and consumer products.

Suitable conditions of the present invention may vary widely depending upon the type of elastomer being reclaimed and the capacity of the equipment being employed. Soaking times may be in the range of at least about 30 minutes to about 20 hours. Suitable pressures for soaking in the process oil is within the range of 50 to 200 pounds per square inch and preferably from 60 psi to 100 psi. Soaking temperatures may range from about 0° C. to 100° C. and preferably from about 20° C. to 80° C. The microwave vacuum cell reactor used for microwave heating was rated for 5 kilowatts (KW) of output and 2000–3000 megahertz (MH) of frequency. The microwave vacuum cell reactor is constructed of materials, e.g., stainless steel.

While the process has been described in reference to the treatment of rubber (synthetic, natural or mixture thereof) it is contemplated that the process is equally applicable to other hydrocarbons including polyolefins and various classes of other plastics such as polyesters, polyamides (e.g., nylon) and other high molecular weight resins and polymers.

In the broad aspect of the present invention, it is suitable to use an essential oil containing limonene, linalool, mycrene or mixtures thereof. Examples of some essential oils which are suitable for the purpose of this invention include oils of orange, orange flowers, bitter orange, orange terpene, lemon lime, peppermint, spearmint, fir, fleabane, lavender, dill, celery and bergamot.

It is preferred to use pure d-limonene, linalool, mycrene or mixtures thereof. It is most preferred to mix either the essential oil or the pure compounds of d-limonene, linalool, mycrene, or mixtures thereof with a commercial nonionic surfactant. The nonionic surfactant is added to the processing oil in proportions ranging from about 1 to 5 weight percent and services to aid in penetration and wet out of the rubber chips and to act as a lubricant in the grinding process.

Suitable nonionics that may be used are the condensation products of a long chain ethylene oxide moiety with an aliphatic alcohol or alkyl phenol. Illustrative nonionic surfactants are available on the market under the tradename of "Neodol" products by Shell Oil Company; "Tergitol" products by Union Carbide, and "Alfol" products by Continental Oil Company.

For large scale operations essential oils referred to as citrus oils are a by-product of citrus juice production are available in large quantities at relatively low cost, have a pleasant odor and are environmentally safe.

Although the invention has been described above in terms of its preferred embodiments, it is understood that various changes may be made without departing from the spirit and scope of the disclosure and claims.

What is claimed is:

1. A process for reclaiming vulcanized rubber comprising the steps of:
   a) impregnating rubber chips obtained from used tire rubber with a composition comprising an essential oil containing a member selected from the group consisting of d-limonene, linalool, mycrene or mixtures thereof;
   b) particulating the treated rubber;
   c) subjecting the rubber particles to microwave heating in the range of 5 KW of output and 2000–3000 MHz of frequency at a reduced pressure whereby substantially all the volatiles are removed and the rubber particles are desulfurized; and
   d) recovering the rubber particles.

2. The process of claim 1 whereby the essential oil is recovered, filtered and recycled.

3. The process of claim 1 wherein the process is conducted without any substantial oxidation of the rubber.

4. The process of claim 1 wherein the impregnation step requires a soaking period of at least 30 minutes.

5. The process of claim 1 wherein said essential oil is d-limonene.

6. The process of claim 5 wherein d-limonene is admixed with from about 1–5 weight percent of a nonionic surfactant.

7. The process of claim 1 wherein the impregnation step requires a soaking period of between 10–13 hours.

* * * * *